US009416340B2

(12) United States Patent
Kyle

(10) Patent No.: US 9,416,340 B2
(45) Date of Patent: Aug. 16, 2016

(54) TEMPERATURE-CONTROLLED LIQUID INFUSING DEVICE

(71) Applicant: Fusion Tower, LLC, Yardley, PA (US)

(72) Inventor: Mathew Kyle, Yardley, PA (US)

( * ) Notice: Subject to any disclaimer, the term of this patent is extended or adjusted under 35 U.S.C. 154(b) by 0 days.

(21) Appl. No.: 14/149,136

(22) Filed: Jan. 7, 2014

(65) Prior Publication Data

US 2015/0191684 A1 Jul. 9, 2015

(51) Int. Cl.
| A47J 31/00 | (2006.01) |
| C12C 12/00 | (2006.01) |
| C12G 1/00 | (2006.01) |
| A47J 31/50 | (2006.01) |
| C12G 3/06 | (2006.01) |
| C12C 5/02 | (2006.01) |

(52) U.S. Cl.
CPC ............... *C12C 12/00* (2013.01); *A47J 31/00* (2013.01); *A47J 31/005* (2013.01); *A47J 31/50* (2013.01); *C12C 5/026* (2013.01); *C12G 1/00* (2013.01); *C12G 3/06* (2013.01); *C12G 2200/21* (2013.01)

(58) Field of Classification Search
CPC ......... A47J 31/00; A47J 31/005; A47J 31/04; A47J 31/057; A47J 31/0689; A47J 31/18; A47J 31/24; A47J 31/50
USPC .............................. 99/322, 323, 317; 206/0.5
See application file for complete search history.

(56) References Cited

U.S. PATENT DOCUMENTS

| 423,127 A | 3/1890 | Childs |
| 1,980,735 A | 11/1934 | Smith |
| 2,078,026 A | 7/1935 | Sandell |
| 2,114,520 A | 4/1938 | Brand |
| 2,259,852 A | 10/1941 | Hall |
| 2,313,226 A | 3/1943 | Daun |
| 2,726,018 A | 12/1955 | Burden |
| 2,997,940 A * | 8/1961 | Pecoraro et al. ................. 99/315 |
| 3,575,352 A | 4/1971 | Hall et al. |
| 4,218,014 A | 8/1980 | Tracy |
| 4,384,512 A * | 5/1983 | Keith .............................. 99/308 |
| 4,437,319 A | 3/1984 | Iannelli |
| 4,593,529 A | 6/1986 | Birochik |
| 4,649,809 A * | 3/1987 | Kanezashi ...................... 99/290 |
| 4,708,266 A | 11/1987 | Rudick |
| 4,810,505 A | 3/1989 | Pachernegg |
| 4,829,771 A | 5/1989 | Koslow et al. |
| 4,899,911 A | 2/1990 | Rohde et al. |
| 4,921,135 A | 5/1990 | Pleet |
| 4,949,552 A | 8/1990 | Adams |

(Continued)

FOREIGN PATENT DOCUMENTS

EP 1 514 836 A1 3/2005

OTHER PUBLICATIONS

International Search Report and Written Opinion, Appl. No. PCT/US2015/026073, Jul. 21, 2015.

*Primary Examiner* — Reginald L Alexander
(74) *Attorney, Agent, or Firm* — Winston & Strawn LLP

(57) ABSTRACT

An invention for infusing liquids, such as beer or wine, at a desired temperature is disclosed. The invention comprises a fillable container to contain the infusing material and the liquid to be infused and a cooling system to maintain the temperature of the liquid at a desired level during infusion. The preferred embodiment can easily be connected to an existing beer faucet mount and has transparent sides to allow the customer to visibly observe the liquid as it is being infused.

49 Claims, 14 Drawing Sheets

(56) References Cited

U.S. PATENT DOCUMENTS

| | | | |
|---|---|---|---|
| 4,993,604 | A | 2/1991 | Gaunt et al. |
| 5,125,534 | A | 6/1992 | Rose et al. |
| 5,129,552 | A | 7/1992 | Painchaud et al. |
| 5,255,825 | A | 10/1993 | Hoff |
| 5,537,825 | A | 7/1996 | Ward |
| 5,694,787 | A | 12/1997 | Cleeland et al. |
| 5,724,883 | A * | 3/1998 | Usherovich .................. 99/290 |
| 6,286,719 | B1 | 9/2001 | Haines |
| 6,490,870 | B1 | 12/2002 | Efremkine |
| 6,546,737 | B1 | 4/2003 | Heyes et al. |
| 7,478,583 | B2 | 1/2009 | Scullion et al. |
| 7,685,936 | B2 | 3/2010 | McDonald |
| 7,878,370 | B2 | 2/2011 | Sevcik et al. |
| 8,002,148 | B2 | 8/2011 | Pakkert et al. |
| 8,047,401 | B2 | 11/2011 | Holler |
| 8,245,629 | B2 | 8/2012 | Little |
| 8,297,180 | B2 | 10/2012 | Skalski et al. |
| 8,322,570 | B2 | 12/2012 | Beavis et al. |
| 8,556,127 | B2 | 10/2013 | Olson et al. |
| 8,998,176 | B2 * | 4/2015 | Bishop et al. .................. 261/59 |
| 2002/0130137 | A1 | 9/2002 | Greenwald et al. |
| 2003/0034360 | A1 | 2/2003 | Lassota et al. |
| 2003/0115892 | A1 | 6/2003 | Fu et al. |
| 2004/0098991 | A1 | 5/2004 | Heyes |
| 2004/0134932 | A1 | 7/2004 | Lobdell |
| 2009/0008407 | A1 | 1/2009 | Sevcik et al. |
| 2009/0044561 | A1 | 2/2009 | Dalton et al. |
| 2010/0018407 | A1 | 1/2010 | Liu |
| 2010/0089943 | A1 | 4/2010 | Till |
| 2010/0230434 | A1 | 9/2010 | Dalton et al. |
| 2010/0269707 | A1 | 10/2010 | Wiemer et al. |

* cited by examiner

TEMPERATURE-CONTROLLED LIQUID INFUSING DEVICE

FIELD OF INVENTION

The present invention generally relates to infusing a liquid at a pre-determined temperature. More specifically, it relates to cooling beer while it is being infused.

BACKGROUND OF THE INVENTION

Beverage infusers, such as those intended for tea, have been in use for thousands of years. Infusing flavors into beer pre and post fermentation has also been common practice for many beer brewers. However, very little has been developed in terms of infusing flavors into beer after the beer has been put into kegs or bottles. Early pioneers of post-packaged beer infusing used a variety of methods to infuse flavors into the beer such as coffee presses, pool filters, and tea infusers. However, all of these methods had two significant issues. First, these methods had no practical way of keeping the beer cold during the infusion process. When beer rises above 38° F., dissolved carbon dioxide in the beer will exit and cause foaming. Secondly, those methods did not have ideal pressure control. When beer leaves the keg at a relatively high pressure and enters a space of relatively low-pressure, such as in a dispensing situation, dissolved carbon dioxide will exit the solution and cause foaming as a result of the pressure drop. Keeping the beer cold can mitigate this foaming, suggesting that temperature control is an important component of a functional beer infuser.

Recent inventions, such as the "Fusion Tower" (Kyle PCT/US13/65429) and Dogfish Head's "Randall," have attempted to solve the temperature issue by rapidly cooling the beer after it has been infused. However, rapidly cooling the beer after it has been infused is not ideal because there is still carbonation loss during the actual infusion process. Other products, such as the Blichmann "Hop Rocket," attempted to solve this issue by putting the entire infuser in a refrigerated space, but that approach deprived the consumer (beer drinker) of the ability to see the infusion process, which has tremendous market value. The Hop Rocket also presented issues with user friendliness because whenever it (or a similarly operating device) needed to be emptied, filled, or refreshed with new ingredients, the user had to leave the bar to tend to the infuser, which is often far away in the keg refrigerator room. Additionally, all three of these previously mentioned inventions required extensive retrofitting to properly integrate into an existing draft beer system. Retrofitting and extensive installation requirements present a large obstacle that is inhibiting large-scale market adoption of any beer infuser.

Thus, there is a need for a simpler infusion device that can overcome these problems.

SUMMARY OF THE INVENTION

The present invention addresses the issue of temperature control during the infusion process in an innovative way. The present invention prevents the liquid from rising above the foaming temperature throughout the infusion process by using a heat exchanger that is in thermal contact with the liquid during the infusion process. The heat exchanger pulls heat from the liquid, thereby maintaining the desired infusion temperature during the infusion process. The heat exchanger is also in thermal contact with a cooling device (for example, a thermoelectric cooling module) that removes heat absorbed by the heat exchanger and transports it away from the liquid during infusion. Embodiments of the invention are particularly well suited for infusing and flavoring beer.

Embodiments of the present invention also solve the foaming problems during infusion by reducing the speed of the liquid as it enters the infusion chamber. Providing multiple entry points for the liquid as it enters the infusion chamber can reduce the speed of the liquid. This reduction also can be accomplished by expanding the diameter of the tube where the liquid enters the infusion chamber from the diameter of the tube in the pre-existing draft system.

Embodiments of the present invention also solve the installation and retrofitting obstacles by being adaptable onto an industry-standard beer faucet mount. Embodiments of the present invention can be attached and functioning within a matter of minutes, not hours. Some embodiments also do not require any additional equipment to operate effectively, such as a glycol cooling system, which can be large and expensive.

In one example, an embodiment of the present invention includes a system for infusing liquids, comprising: a fillable container with an interior adapted to contain an infusing material and a liquid; a first inlet adapted to receive the liquid; a valve in fluid communication with the fillable container and the first inlet; a plurality of second inlets with openings in fluid communication with the valve and the interior of the fillable container, wherein the second inlets are located after the valve; a first outlet located at the top of the interior of the fillable container and in fluid communication with the interior of the fillable container; a filter located in the fillable container; a second outlet in fluid communication with the first outlet, wherein the second outlet is located below and after the first outlet; a heat exchanger in thermal contact with the interior of the fillable container; a thermoelectric cooling device in thermal contact with the heat exchanger to control the temperature of the liquid as it is being infused; a temperature adjustment controller connected to the thermoelectric cooling device; a heat sink in thermal contact with the thermoelectric cooling device; a cooling fan located proximate to the heat sink and positioned to remove heat from the heat sink; a handle connected to the valve; a temperature display connected to the thermoelectric cooling device; a power switch coupled to the thermoelectric cooling device and the cooling fan; and wherein the fillable container has clear, vacuum-jacketed sides.

In another example, an embodiment of the present invention includes a system for infusing liquids, comprising: a fillable container with an interior adapted to contain an infusing material and a liquid; a first inlet with an opening adapted to receive the liquid; a valve in fluid communication with the fillable container and the first inlet; a first outlet in fluid communication with the interior of the fillable container; a heat exchanger in thermal contact with the interior of the fillable container; and a cooling device in thermal contact with the heat exchanger to control the temperature the liquid as it is being infused.

In still another example, an embodiment of the present invention includes a system for infusing liquids, comprising: a fillable container with an interior adapted to contain an infusing material and a liquid; a first inlet with an opening adapted to receive the liquid; a valve in fluid communication with the fillable container and the first inlet; a first outlet in fluid communication with the interior of the fillable container; a heat exchanger in thermal contact with the interior of the fillable container; a thermoelectric cooling device in thermal contact with the heat exchanger to control the temperature of the liquid as it is being infused; a heat sink in thermal contact with the thermoelectric cooling device; a cooling fan in thermal contact with the heat sink; a shell containing the cooling fan and the heat sink; a vent in the shell; and a thermal barrier connected to the shell and the heat exchanger such that the thermal barrier is located between the shell and the heat exchanger.

In another example, an embodiment of the present invention includes a system for infusing liquids, comprising: a fillable container with an interior adapted to contain an infusing material and a liquid; a first inlet with an opening adapted to receive the liquid; a valve in fluid communication with the fillable container and the first inlet; a first outlet in fluid communication with the interior of the fillable container; a heat exchanger in thermal contact with the interior of the fillable container; a canister adapted to hold a cooling medium in thermal contact with the heat exchanger to control the temperature of the liquid as it is being infused.

In yet another example, an embodiment of the present invention includes a system for infusing liquids, comprising: a fillable container with an interior adapted to contain an infusing material and a liquid; a first inlet with an opening adapted to receive the liquid; a valve in fluid communication with the fillable container and the first inlet; a first outlet in fluid communication with the interior of the fillable container; a heat exchanger in thermal contact with the interior of the fillable container; a cooling device in thermal contact with the heat exchanger to control the temperature of the liquid as it is being infused; a drain port located at the bottom of the fillable container and in fluid communication with the fillable container and wherein the valve is also in fluid communication with the drain port and wherein the valve has at least the following settings: a standby setting that does not allow the liquid to exit the system, a dispensing setting that allows the liquid to flow through and out of the system, and a drain setting that blocks the liquid from entering the fillable container but allows the liquid in the fillable container to leave the system through the drain port; a second inlet with an opening in fluid communication with the valve and the interior of the fillable container, wherein the second inlet is located after the valve; a second outlet in fluid communication with the first outlet, wherein the second outlet is located after the first outlet; a first filter located in the fillable container; a temperature adjustment controller connected to the cooling device; and wherein the first outlet is located above the bottom of the fillable container and the second outlet is located below the first outlet.

In still another example, an embodiment of the present invention includes a system for infusing a liquid, comprising: two infusing devices wherein each infusing device is comprised of: a fillable container with an interior adapted to contain an infusing material and a liquid; a first inlet adapted to receive the liquid; a valve in fluid communication with the fillable container and the first inlet; a first outlet in fluid communication with the interior of the fillable container; a heat exchanger in thermal contact with the interior of the fillable container; and a cooling device in thermal contact with the heat exchanger to control the temperature of the liquid as it is being infused; wherein the first inlet of each infusing device is connected to a single source of liquid.

In yet another example, an embodiment of the present invention includes a system for infusing a liquid, comprising: two infusing devices wherein each infusing device is comprised of: a fillable container with an interior adapted to contain an infusing material and a liquid; a first inlet adapted to receive the liquid; a valve in fluid communication with the fillable container and the first inlet; a first outlet in fluid communication with the interior of the fillable container; a heat exchanger in thermal contact with the interior of the fillable container; and a cooling device in thermal contact with the heat exchanger to control the temperature of the liquid as it is being infused; wherein the first outlet of the first fillable container is in fluid communication with the first inlet of the second fillable container.

In still another example, an embodiment of the present invention includes a method of infusing a liquid, comprising: placing an infusing material in a fillable container; transferring the liquid into the fillable container; infusing the liquid in the fillable container by putting the liquid in contact with the infusing material; controlling the temperature of the liquid in the fillable container as the liquid is being infused; and dispensing the liquid from the fillable container after the liquid has been infused.

In yet another example, an embodiment of the present invention includes a method of infusing a liquid, comprising: placing an infusing material in a fillable container; transferring the liquid into the fillable container; infusing the liquid in the fillable container by putting the liquid in contact with the infusing material; controlling the temperature of the liquid in the fillable container as the liquid is being infused; filtering the liquid after infusing and before dispensing; and dispensing the liquid from the fillable container after the liquid has been infused; wherein the temperature of the liquid is controlled with a thermoelectric cooling device and at least a portion of a side of the fillable container is transparent.

Other examples of embodiments of the present invention can include embodiments with only some of the various elements identified above in the exemplary embodiments.

DETAILED DESCRIPTION

Figure 1:
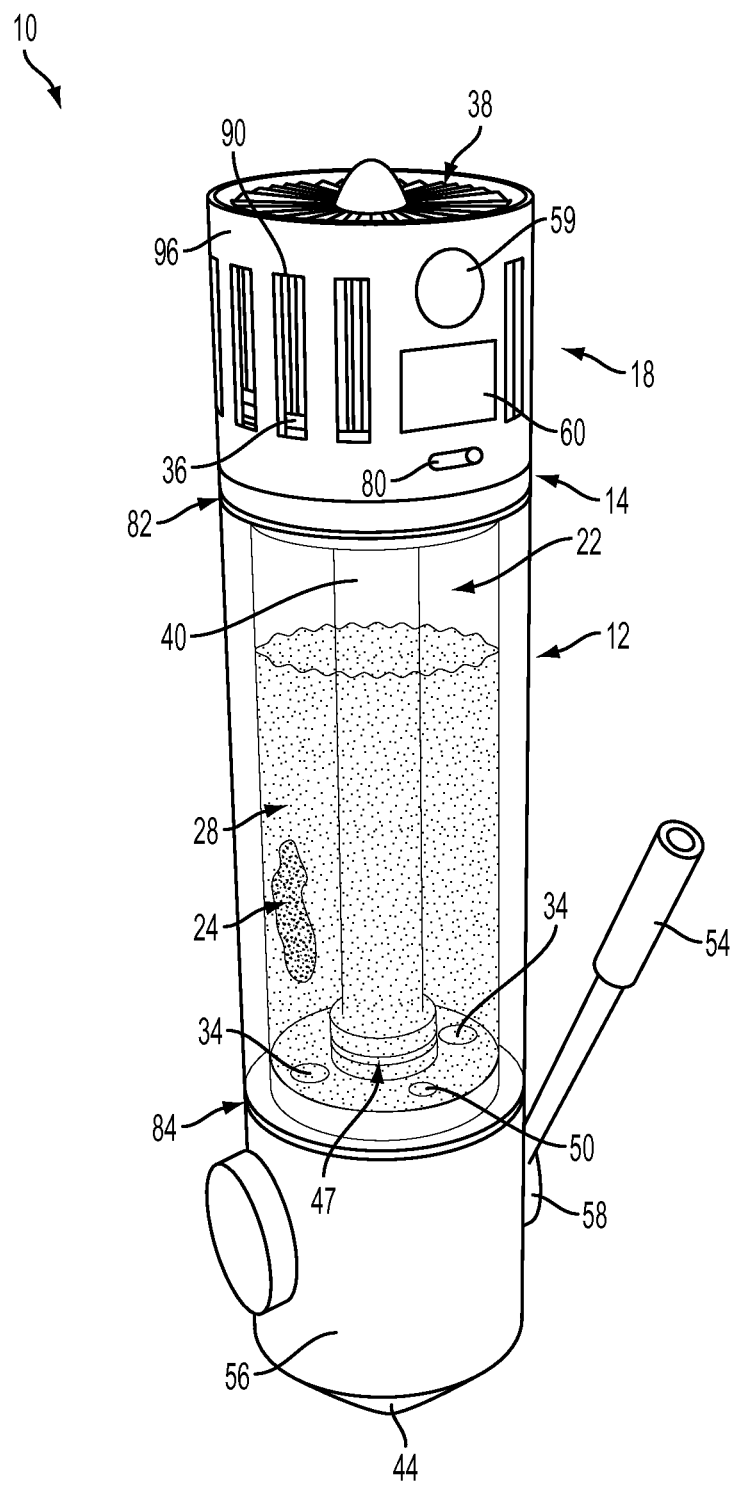
FIG. 1 is a front view of a preferred embodiment.
Figure 2:
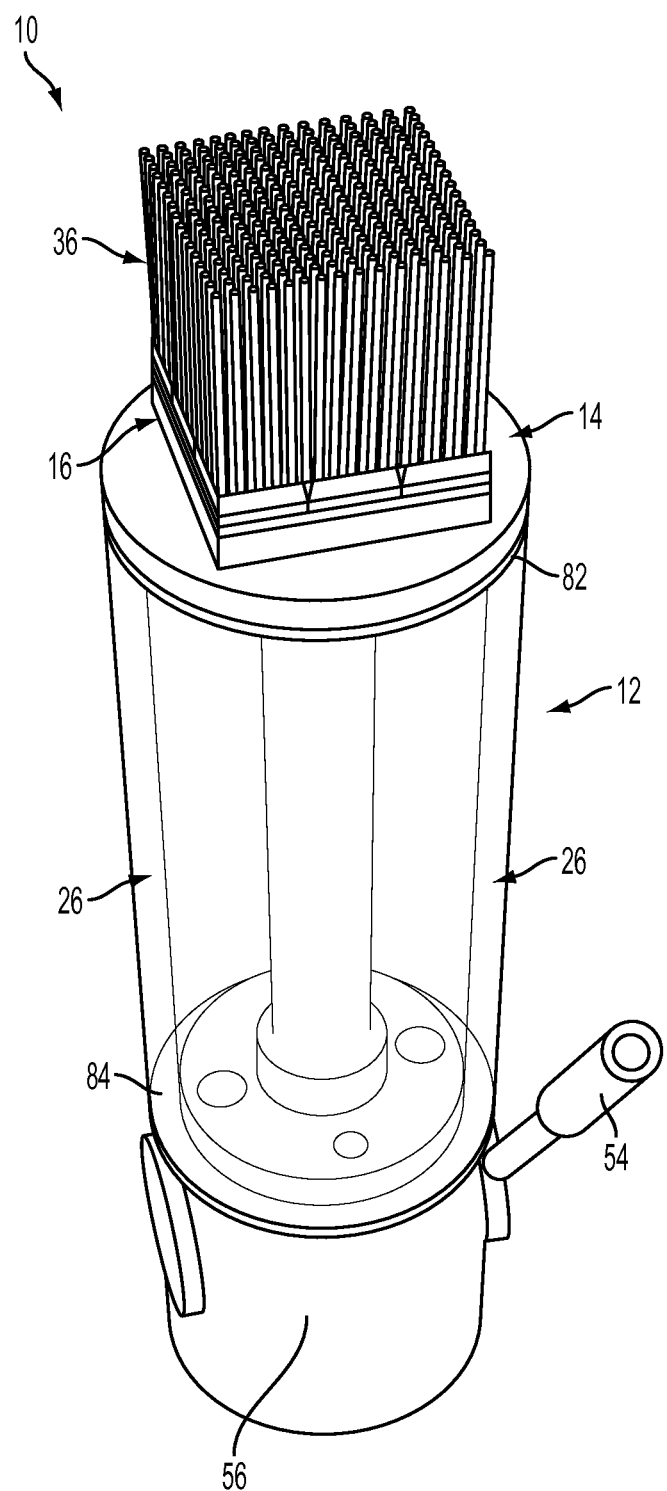
FIG. 2 is a top front view of a preferred embodiment with the cooling fan and shell removed.

FIGS. 1 and 2 illustrate the preferred embodiment of the invention, and it is only one of many possible embodiments of the invention. This infuser embodiment 10 is comprised of a 2.75" diameter by 6" high cylindrical fillable container 12, a heat exchanger 14, and at least one thermoelectric cooling device 16. While fillable container 12 is cylindrical in shape in this embodiment, it could also be of different shapes and sizes (such as a rectangular, hexagonal, or arbitrary shape) and still fall within the scope of the invention. This particular size of fillable container 12 is sufficiently large enough to hold at least one serving of liquid 28 in order to allow it to be infused before being dispensed. In order to infuse a liquid, the user places infusing materials 24 in the interior 22 of fillable container 12. Liquid 28 from a source of liquid such as a beer keg, bright beer tank, beer growler, wooden aging barrel, wine cask, water line, or soft drink line, among others, enters fillable container 12 through a valve and a series of inlets described in more detail below. Once infused, liquid 28 flows through and out of infuser 10 via an outlet to be dispensed as desired by the user.

Interior 22 of fillable container 12 can be filled with a variety of infusing materials 24 in order to infuse liquid 28. For example, infusing material 24 can be a plant (such as mint), a flower (such as hops), a fruit (such as an orange, banana, cherry, blueberry, raspberry, or cranberry), a vegetable (such as a pepper or pumpkin), a bean (such as a vanilla or coffee), a nut or legume (such as a pistachio or peanut), a seed (such as cardamom), a wood (such as oak or oak soaked in a distilled spirit), a spice (such as cinnamon or pepper), an herb (such as lavender or rosemary), a root (such as ginger), an extract, a syrup (such as maple syrup), chocolate, candy, or any other type of flavoring item (such as an oil, resin, gel, or powder). Most typically, infusion imparts a new or enhanced flavor to liquid 28, although the infusion could be done for other purposes, such as for imparting vitamins, boosters, or remedies for medicinal or health-related reasons to liquid 28. These infusing materials can come not only in the natural form of the material, but also in different forms, such as powders, liquids, solids, pastes, or particulates. The prior list and categories are merely illustrative of the many type of infusing materials that can be used with the infuser 10, and are not meant to be an exhaustive list of all possible infusing materials. One of ordinary skill in the art would recognize many other types of infusing materials could be placed (or placed in combination) inside fillable container 12.

Figure 3:
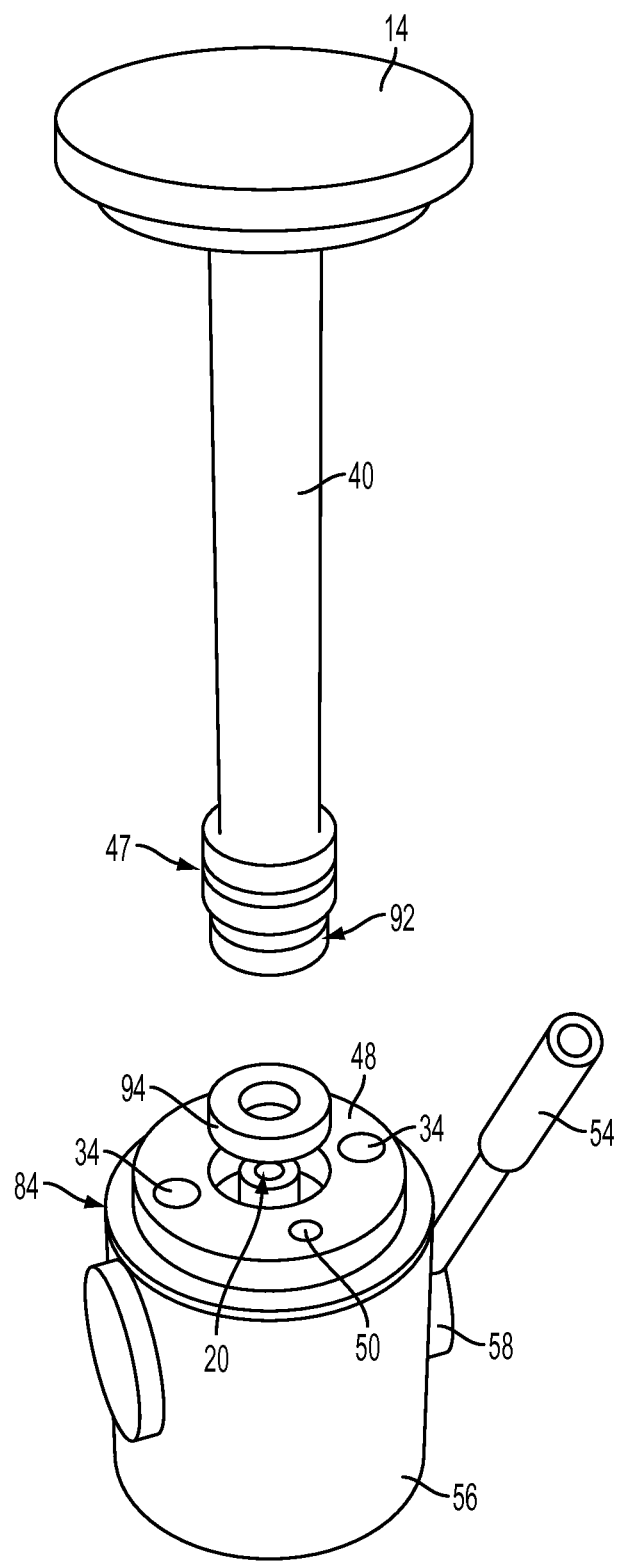
FIG. 3 is an internal front view of a preferred embodiment showing the tubular column and base of the infuser.

In the center of fillable container 12 is a 0.75" diameter by 6" high cylindrical tubular column 40 that extends from the bottom of fillable container 12 to the top of fillable container 12. Tubular column 40 can be made of stainless steel or any other food-safe material and can also be of different geometric cross-sections (such as square, hexagonal, etc.), as desired. As shown in FIG. 3, tubular column 40 has a magnetic base 92 that is reversibly attachable to a bottom plate 48, which has a corresponding magnetic implant 94 to allow access to the interior 22 of fillable container 12 for cleaning purposes or to place or replace infusing material 24. Alternatively, tubular column 40 could be threaded into the base of infuser 10 for removal. Additional modes of attachment such as electromagnetic coupling can also be used.

In order to enhance the end user's experience of having his or her liquid infused and to further insulate fillable container 12, fillable container 12 has transparent, vacuum-jacketed sides/walls 26 so that the user can watch liquid 28 being infused and flavored with infusing material 24 as it happens, as shown in FIGS. 1 and 2. The vacuum jacketing of walls 26 provides a layer of insulation between fillable container 12 and the outside, thereby assisting in maintaining the temperature inside fillable container 12 during the infusion process. Clear walls 26 can be made of any transparent, food-safe material, such as glass, glass derivative, polycarbonate, acrylic, or PET plastic compound, for example. While having clear walls enhances the user's experience, neither clear walls nor vacuum jacketed walls are required for infuser 10 to function. Sides/walls 26 could be made of a non-transparent material, such as stainless steel or aluminum, or a combination of transparent and non-transparent materials, such as stainless steel with glass windows, and still fall within the scope of the invention. Alternatively, sides/walls 26 may be made from a thermally conductive material and thermally coupled to thermoelectric cooling device 16 to act as a primary or secondary heat exchanger in concert with heat exchanger 14. In this particular embodiment, as can be seen from FIGS. 1 and 5, fillable container 12 is a cylinder with an open top and an open bottom that fits over tubular column 40. In order to prevent leakage, the top of fillable container 12 is sealed against heat exchanger 14 by gasket 82, and the bottom of fillable container 12 is sealed against base 56 of infuser 10 by gasket 84. In alternative embodiments, the top or bottom (or both) of fillable container 12 could be fully or partially closed and fall within the scope of the invention.

Figure 4:
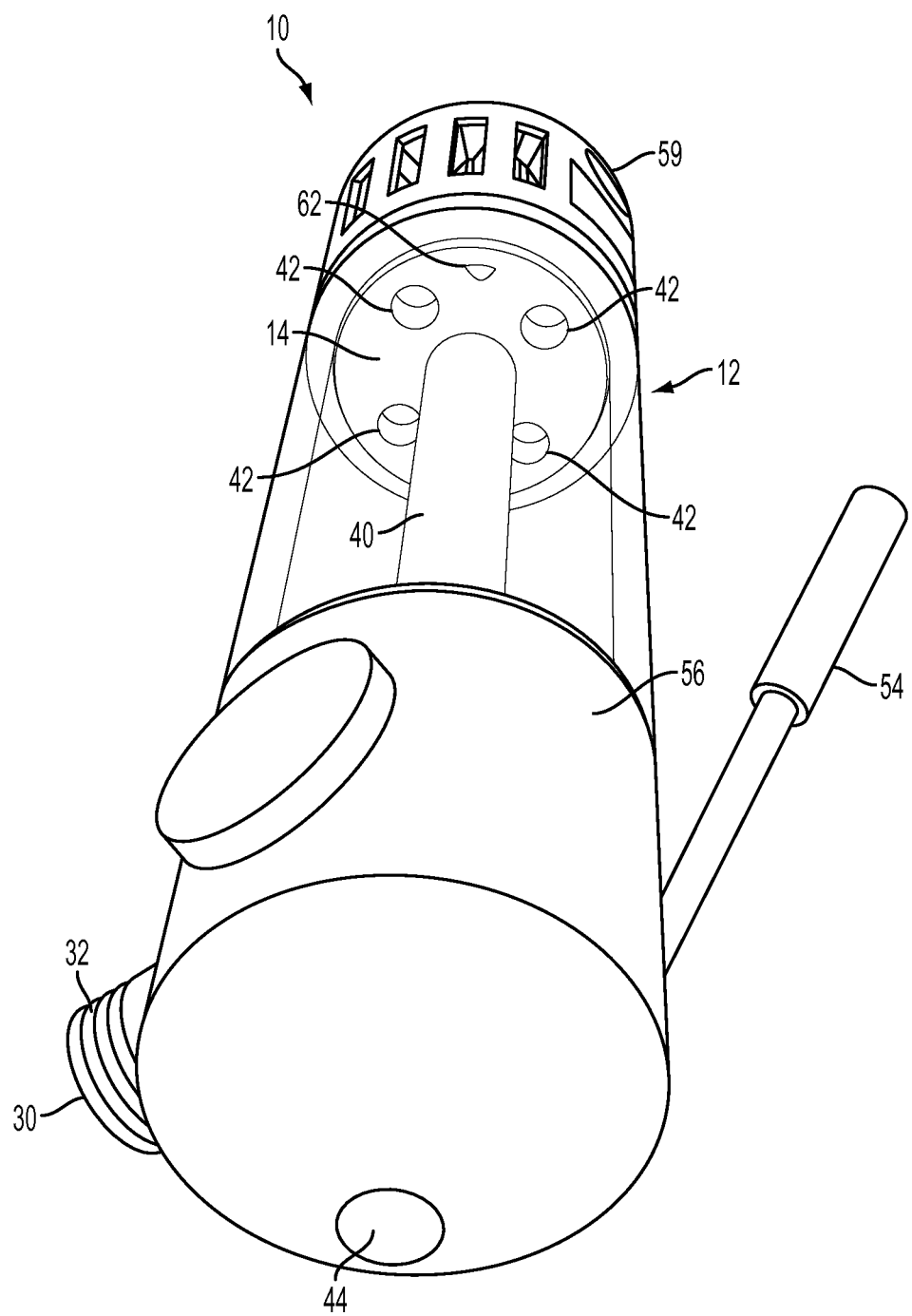
FIG. 4 is a bottom side view of a preferred embodiment.

As shown in FIG. 4, liquid 28 (such as beer) enters fillable container 12 through first inlet 30 (with an interior opening having a diameter between 0.1875" to 0.25", depending on the diameter of the liquid source coupling) in the base 56 of infuser 10. Alternatively, first inlet 30 can have a different diameter to accommodate connection with the liquid source, ranging from 0.1875" to 1", for example. First inlet 30 has a threaded end 32 that extends from the base 56 of infuser 10 so as to be able to connect infuser 10 to an industry standard faucet mount. Other ends and couplers, as are known in the art, could be used and fall within the scope of the invention.

Figure 5:
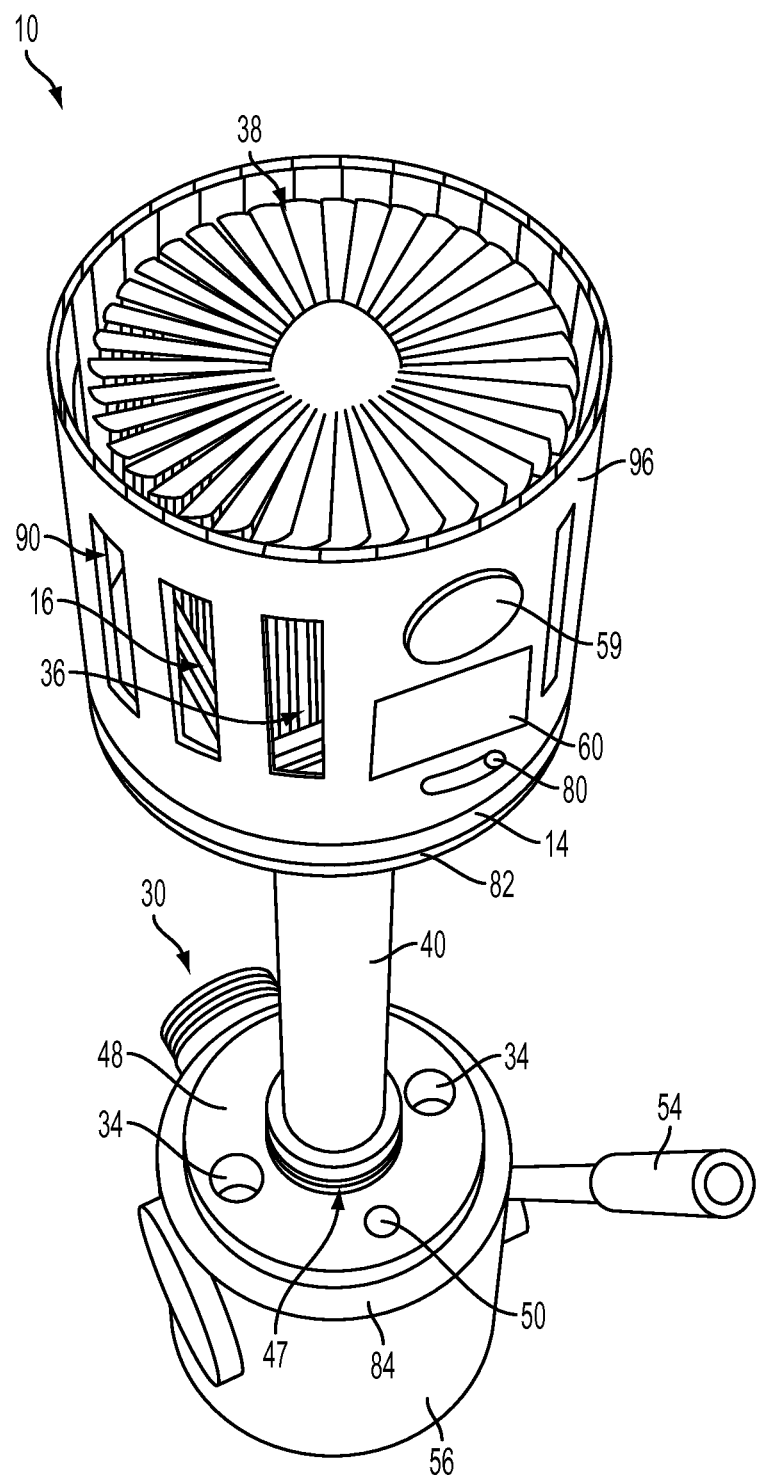
FIG. 5 is a top view of a preferred embodiment with various elements removed.

The terminal line pressure (meaning the pressure inside the beverage line immediately before it adapts to the dispenser) of most beer dispensing systems is between 4 to 6 PSI. While this pressure is conducive to pouring beer, it can present issues for a bottom-filled infuser. When beer enters a chamber at a high velocity, it can geyser and splash, causing foaming and ultimately flat beer. To reduce this geysering effect, liquid 28 flows into first inlet 30 and passes through a short channel section before exiting into fillable container 12 via two second inlets 34 near bottom plate 48, as shown in FIG. 5. The geysering effect can be further minimized by reducing the speed even further by making the openings of second inlets 34 with a shape having a larger exiting diameter than the diameter of the opening of first inlet 30, such as a cone or other kinds of geometry. Different numbers of second inlets, with or without conical shapes, could be used (including a single second inlet 34) and still fall within the scope of this invention. Bottom plate 48 is made of chrome-plated aluminum or another food-safe material such as stainless steel or PTFE.

By filling fillable container 12 from the bottom, liquid 28 gradually fills fillable container 12 from the bottom to the top, thereby pushing most, if not all, of the trapped air in fillable container 12 out of infuser 10. When liquid 28 completely fills fillable container 12, there will be little to no trapped air inside fillable container 12, thereby leaving little to no space for dissolved gasses in liquid 28 to leave liquid 28. This configuration forces most of the dissolved gasses to remain in liquid 28, delivering exceptional gas retention without exerting a counter pressure within the system.

Figure 6:
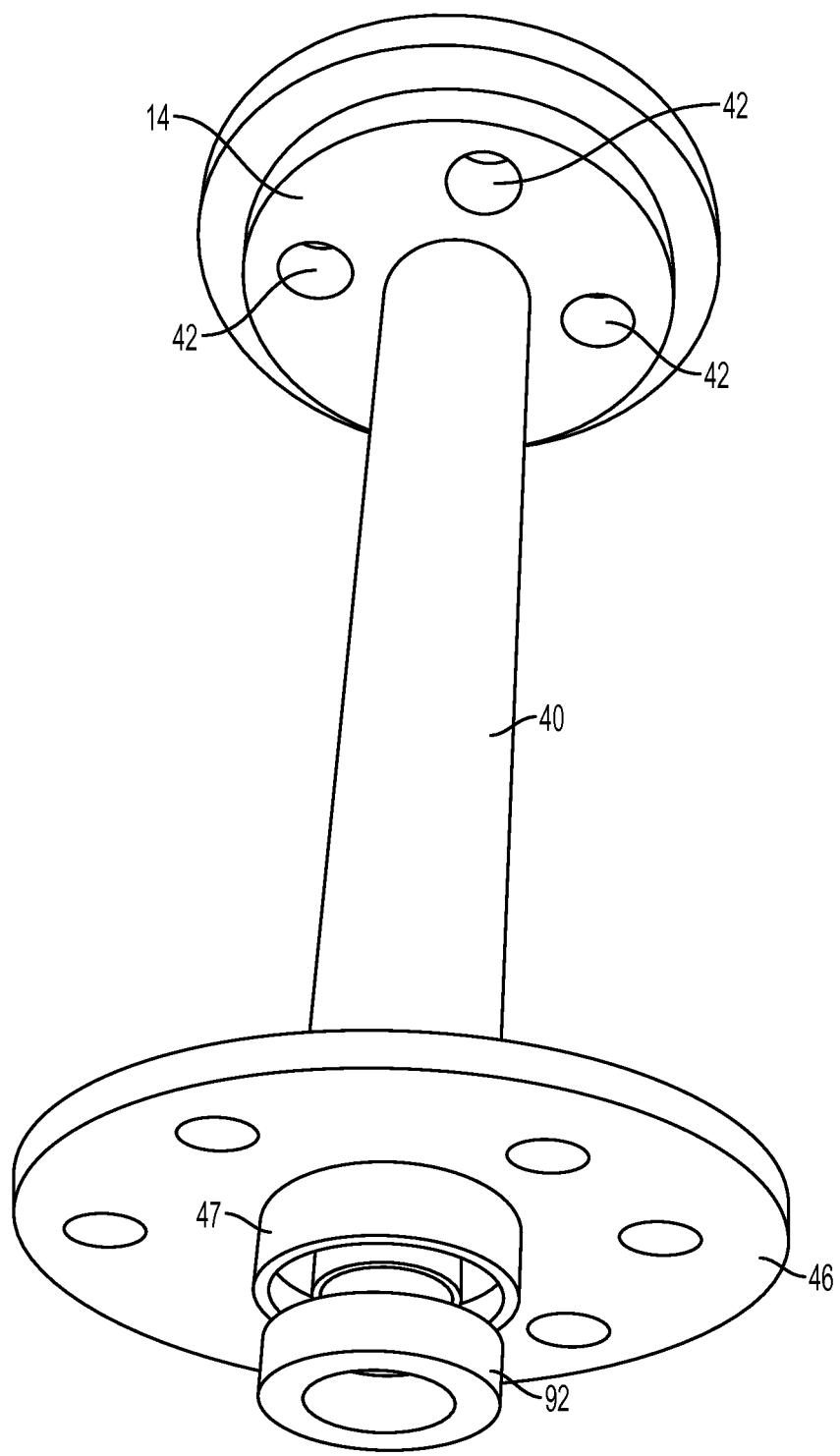
FIG. 6 is a bottom view of the tubular column of a preferred embodiment.
Figure 8:
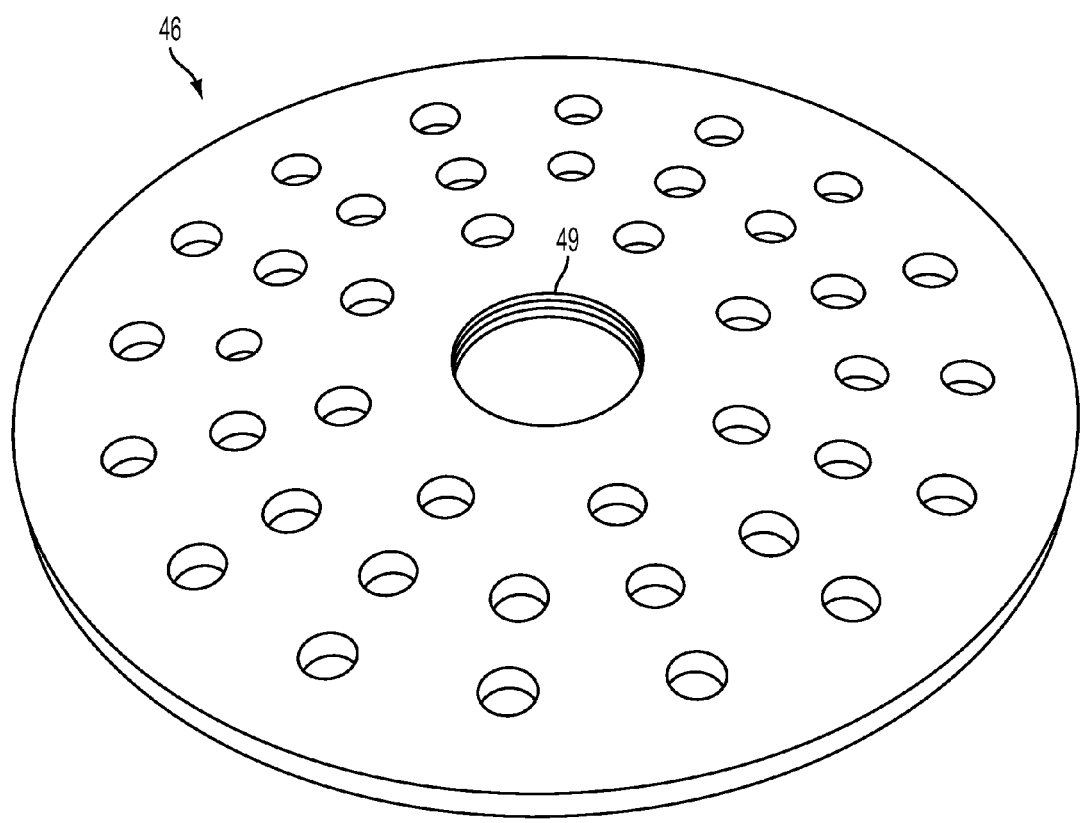
FIG. 8 is a view of one of the filters of a preferred embodiment.

Filter 46 (shown in FIGS. 6 and 8) acts as a holding means for infusing material 24. When infuser 10 is drained of liquid 28, filter 46 will act as a floor as the top 18 of infuser 10 is removed. The top 18 of infuser 10 is then rotated upside-down, where filter 46 can be removed to provide access to fillable container 12. Once the interior has been emptied, cleaned, or replaced with infusing material 24, filter 46 is twisted back into place at filter connection 47 where it is held it place by filter threads 49. The top 18 of infuser 10 can then be rotated right side up and placed back on the bottom of infuser 10 where it secured in place by magnets 92 and 94.

In another embodiment, a second filter is located near the top of fillable container 12 and surrounds tubular column 40 in order to reduce the chance of the infusing material 24 exiting fillable container 12 further. In another embodiment, this additional filter covers first outlets 42. The vertical location of this additional filter could also be adjusted in fillable container 12.

One of ordinary skill in the art will also recognize that these filters can be made from a variety of materials, such as a metal or plastic perforated screen or mesh or a micron filter and can be produced in a variety of shapes, sizes, and porosity and still achieve the desired filtering and containing effect. It would also be well understood that a single filter, or multiple filters, could be used in a variety of configurations. It is also understood that filter 46, or any filtering mechanism implemented, could be fashioned such that it can behave as a comprehensive "holding shape" (such as a perforated basket shape) to contain infusible material in addition to providing filtering properties.

Figure 7:
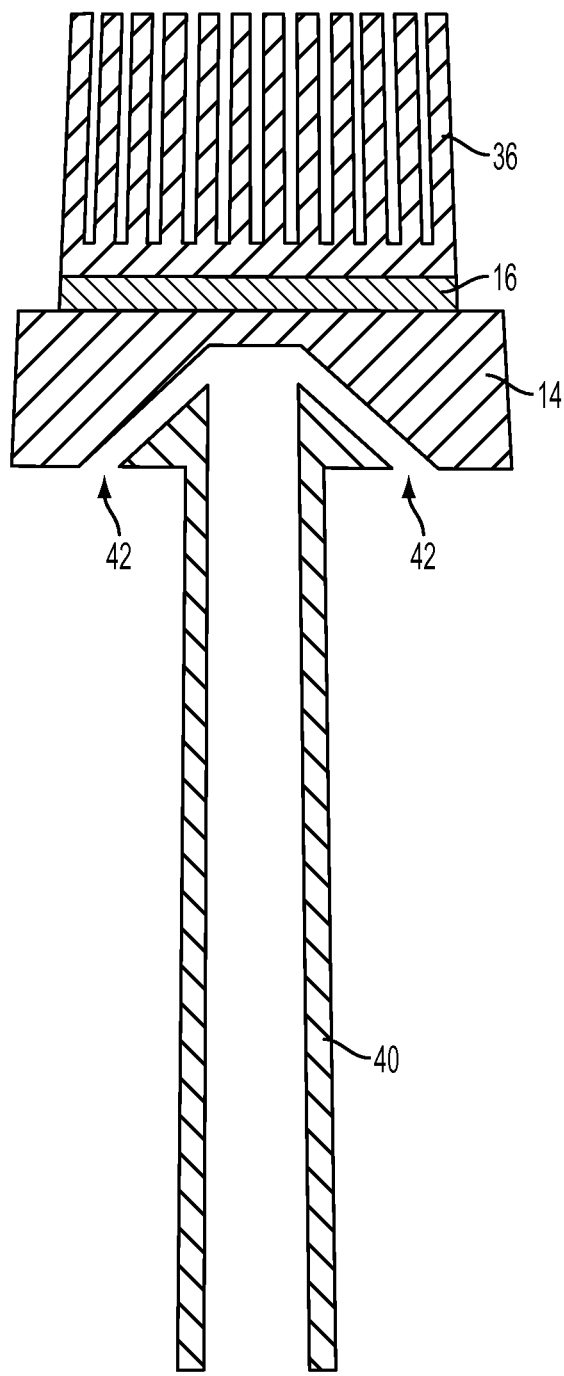
FIG. 7 is a cross-sectional view of the tubular column of a preferred embodiment.

Liquid 28 leaves fillable container 10 via four 0.25" diameter first outlets 42 in heat exchanger 14 at the top of fillable container 12. As shown in FIGS. 4, 5, and 7, liquid 28 travels from first outlets 42 through channels in heat exchanger 14 to a 0.25" diameter channel in the interior of tubular column 40 and then to a 0.375" diameter second outlet 44 near the bottom of fillable container 12. The user can place a glass to receive infused liquid 28 below second outlet 44.

By placing first outlets 42 at the top of fillable container 12, more liquid 28 can be retained in fillable container 12 before it exits infuser 10, thereby speeding the process of serving infused liquid 28. Moreover, the liquid exiting fillable container 12 will be the liquid closest to thermoelectric cooling device 16, which should be closer to the desired temperature and maximally infused, as opposed to the liquid that has just entered fillable container 12 at the bottom. In addition, by placing first outlets 42 at the top of fillable container 12, it reduces the chance that pieces of infusing material 24 may exit fillable container 12 with the infused liquid. In an alternative embodiment, liquid 28 can leave fillable container 12 via first outlet(s) 42 in the column of tubular column 40. Different numbers and locations of first outlets 42 (including a single first outlet) could be used and fall within the scope of this invention.

Figure 10:
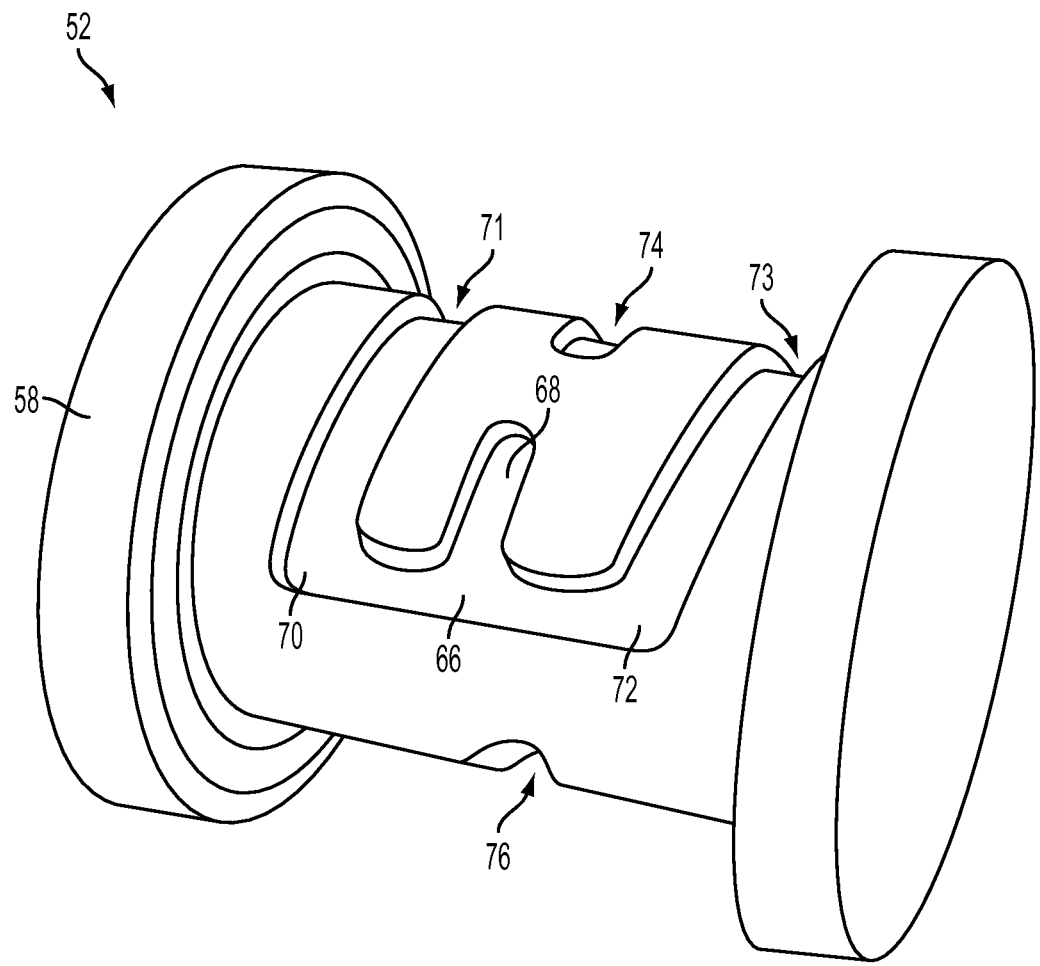
FIG. 10 is a back view of the rotary valve of a preferred embodiment.
Figure 11:
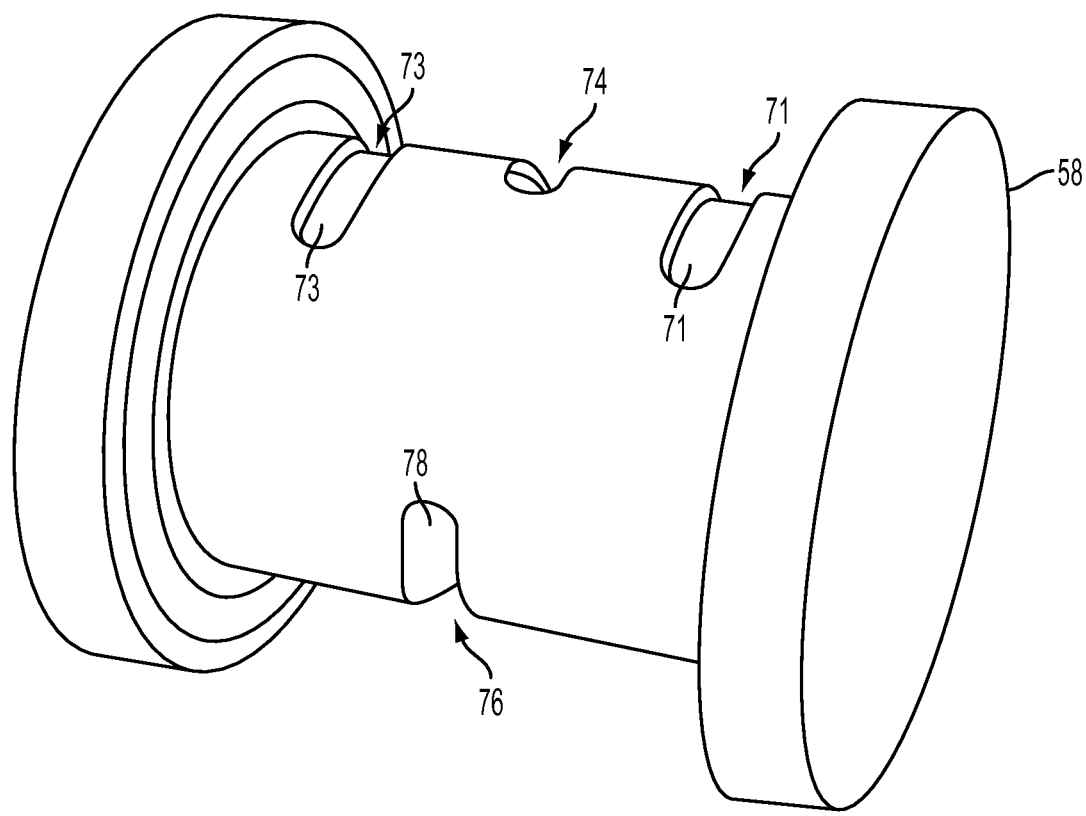
FIG. 11 is a front view of the rotary valve of a preferred embodiment.

In the preferred embodiment, infuser 10 makes use of a rotating valve 52 that controls the fluid communication of liquid 28 within the infuser and into and out of fillable container 12. As shown in FIGS. 10 and 11, rotary valve 52 has three positions or settings: a "standby" position, a "dispensing" position, and a "drain" position.

Figure 9:
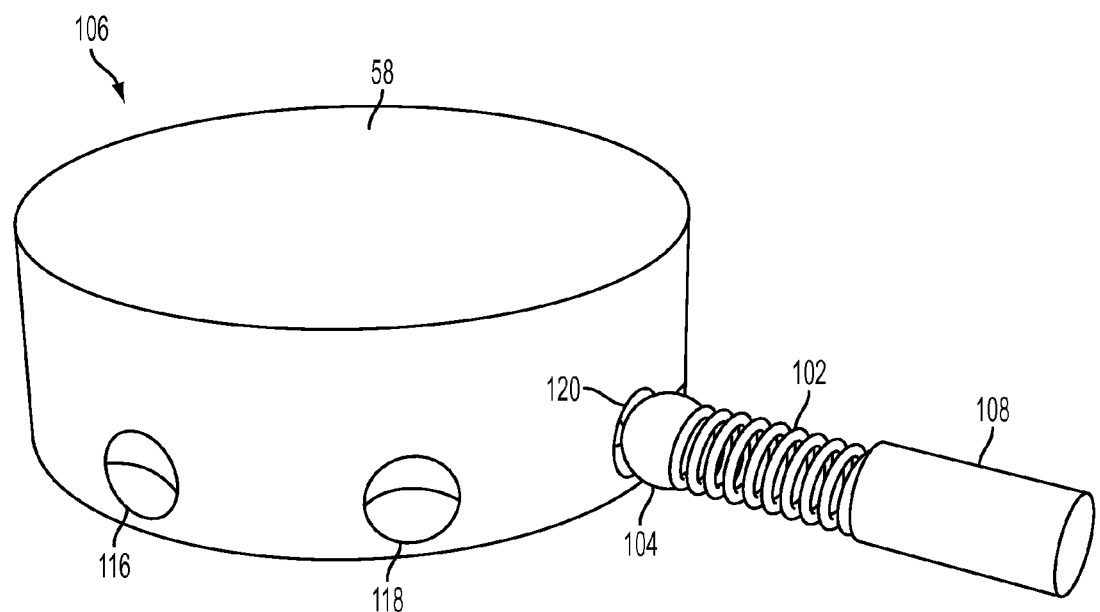
FIG. 9 is a view of the rotary valve end of a preferred embodiment.

The user can begin to dispense infused liquid through second outlet 44 by rotating rotary valve 52 forward to the dispensing position via rotary valve handle 54, wherein rotary valve handle 54 would be at a 45° angle to the main body of infuser 10. The user receives tactile feedback from rotary valve 52 in the way of a position feedback assembly 106, which is comprised of three detents 116, 118, 120, a spring 102, a ball bearing 104, and a feedback assembly cover 108, as shown in FIG. 9. The detents exist on the circumference of rotary valve end 58 and correspond to the three valve positions that rotary valve 52 is designed to exist in. As the user rotates rotary valve 52, rotary valve end 58 will rotate alongside ball bearing 104 until ball bearing 104 is pressed into a detent by virtue of spring 102. This seating will result in tactile feedback that will assist the user in determining when the rotary valve 52 has been rotated into the correct position.

In the "standby" position, rotary valve handle 54 is parallel to infuser 10's main body. When infuser 10 is connected to a liquid source, liquid 28 enters the device through first inlet 30 and enters rotary valve 52 at the first valve inlet 68. Liquid 28 then travels past second valve inlet 66 and splits into two secondary inlets 70 and 72 before traveling along the surface of rotary valve 52 to first valve outlet 71 and second valve outlet 73, where liquid 28 can enter fillable container 12 through second inlets 34. Liquid 28 then fills fillable container 12 and tubular column 40 (via first outlets 42) to be ready to be dispensed. In this position, liquid 28 cannot exit through second outlet 44 because rotary valve 52 blocks second outlet 44.

When rotary valve 52 is in the "dispensing" position, liquid 28 enters fillable container 12 through first inlet 30 and enters rotary valve 52 at second valve inlet 66. Liquid 28 diverges into two paths as liquid 28 passes through the first secondary inlet 70 and the second secondary inlet 72 and then through first valve outlet 71 and second valve outlet 73 where the liquid is permitted to enter the fillable container through second inlets 34. When rotary valve 52 is in the "dispensing" position, liquid 28 can flow through and out of infuser 10 by filling fillable container 12, passing through one or more of first outlets 42, traveling back down through interior of tubular column 40, entering rotary valve 52 through rotary valve entry hole 20, passing through third valve inlet 74, continuing through third valve outlet 76, and finally exiting infuser 10 through the second outlet 44. The "dispensing" position is achieved by pulling rotary valve handle 54 towards the user at a 45° angle.

When rotary valve 52 is in the "drain" position, rotary valve 52 blocks liquid 28 from entering fillable container 12 through any inlet on rotary valve 52. Third valve inlet 74 is rotated generally underneath drain port 50 such that any contained liquid 28 with infuser 10 can leave infuser 10 by passing through a 0.25" drain port 50, passing through third valve inlet 74, passing through valve drain outlet 78, and ultimately exiting infuser 10 through second outlet 44. After liquid 28 has been drained from infuser 10, the user can begin to disconnect the magnetic connection to access the interior 22 of fillable container 12. The "drain" position is achieved by pushing rotary valve handle 54 away from the user at a 45° angle.

In addition to the three valve functions mentioned above, there are other possible valve functions that are also useful. One in particular is a "bypass" position or setting, wherein the incoming liquid 28 enters infuser 10 through first inlet 30, enters rotary valve 52, and flows out of second outlet 44. This function would permit liquid 28 to bypass fillable container 12 and the infusion process completely, allowing the user to dispense non-infused liquid from the same device.

One of skill in the art would recognize that there are other designs and configurations of rotary valve 52 and rotary valve end 58 that could be used to accomplish the same functionality and still fall within the scope of the invention. For example, rotary valve handle 54 could be replaced by a solenoid or other automated system that is responsive to electronic or computer control. Rotary valve 52 could also be replaced by a series of independently controllable valves that open and close various pathways between first inlet 30, second inlets 34, fillable container 12, second outlet 44, and drain port 50 in order to cycle the infuser between the standby, dispense, drain, and bypass modes/settings.

The temperature of liquid 28 is controlled during infusion via thermoelectric cooling device 16, which is coupled to a cooling system comprised of tubular column 40, heat exchanger 14, thermoelectric cooling device 16, heat sink 36, and cooling fan 38. The primary method of keeping liquid 28 cool is via thermoelectric cooling device 16, which is coupled to heat exchanger 14 and tubular column 40 that are in direct contact with liquid 28. Heat exchanger 14 can be a 0.75" thick piece of stainless steel, aluminum, copper alloy, or any other food-safe material that can conduct heat away from liquid 28 to thermoelectric cooling device 16. Heat exchanger 14 is in thermal contact with the top of tubular column 40, so as to help conduct heat from liquid 28 to heat exchanger 14 through tubular column 40. Heat exchanger 14 can have features that maximize its exposed surface area (such as fins, ribbing, protrusions, or dimples) in order to more efficiently transfer heat away from liquid 28. Heat exchanger 14 can also take other forms, including pipe, shell, tube, plate, fin, and direct contact heat exchangers, among others, that are known in the industry, or be made into a decorative element, in addition to its functional element, and fall within the scope of the invention. It is desirable that heat exchanger 14 is smooth and contoured to permit easier cleaning and to help resist bacterial growth and accumulation that can occur when there are sharp edges or angles. Gasket 82 seals heat exchanger 14 to the top of fillable container 12 so as to prevent liquid 28 from leaking from infuser 10.

A thermoelectric cooling device works by receiving an electrical current and converting the electrical current into a temperature differential across the device. When the electric current is flowing through a thermoelectric cooling device, one side of the device heats up while the other side cools down. Such a device is limited by its thermal mass, meaning that the hot side of the device will eventually begin to warm the cold side. As shown in FIG. 2, in order to minimize this heating effect of the thermoelectric cooling device 16, heat sink 36 is located on the hot side of thermoelectric cooling device 16 and is attached to thermoelectric cooling device 16 by a thermally conductive epoxy or adhesive. The cold side of thermoelectric cooling device 16 is attached to heat exchanger 14 by a thermally conductive epoxy or adhesive, as well. Heat sink 36 is pin-finned in order to increase the conduction of heat away from thermoelectric cooling device 16. Heat sink 36 can be designed in a way that maximizes its exposed surface area to be optimally cooled with cooling fan 38. However, heat sink 36 can also be a large piece of material, such as a copper block. One of ordinary skill in the art can recognize that there are many other configurations for heat sink 36 and other ways to couple thermoelectric cooling device 16 to heat exchanger 14 and heat sink 36.

As shown in FIG. 5, a heat dissipating cooling fan 38 is placed in the opposite side of heat sink 36 from thermoelectric cooling device 16 so as to remove the heat accumulated by heat sink 36 from thermoelectric cooling device 16. As shown in FIG. 1, the top 18 of infuser 10 is enclosed by shell or cover 96 with vents 90 to allow air to be exhausted from shell 96 after passing through and over heat sink 36. Temperature adjustment knob 59 (or other controller, such as a dial, slider, switch, potentiometer, touchpad, or keypad, for example) allows the user to set the desired infusion temperature, which is monitored by temperature sensor 62 (such as a thermocouple) located in heat exchanger 14 and controlled by thermoelectric cooling device 16. Temperature display 60 is located on the front of infuser 10 so that the user can see the temperature setting. Alternatively, temperature display 60 could also display the temperature of liquid 28 as it is being infused if the user desires that information. Temperature display 60 can be an LED, LCD, gauge, or other type of visual display device coupled to thermoelectric cooling device 16 or temperature sensor 62 that is capable of indicating temperature. Power switch 80 turns on and off the power to thermoelectric cooling device 16 and cooling fan 38, and it can be coupled to a standard 110 VAC power source (or whatever power source is required to power thermoelectric cooling device 16 and cooling fan 38 installed in infuser 10). In the preferred embodiment, the electrical components are powered through a DC barrel jack plug, located on the top of infuser 10. One skilled in the art would also realize that the device could operate entirely on, or with the assistance of, batteries. The batteries could be charged with a similar DC barrel jack port, other charging means, or wirelessly through the use of inductance.

FIG. 5 also shows heat-dissipating cooling fan 38 located near the top of the device and orientated such that airflow is inducted from above the device and out through vents 90 in shell 96, rather than in through vents 90. This is advantageous because it provides the best airflow to the heat sink 36 when multiple infusers 10 are placed side by side, or when the infuser 10 is located next to anything that would interfere with incoming airflow such as an oversized draft beer dispensing handle located on either side. However, in an alternative embodiment, the air-flow direction of fan 38 could be reversed and draw air in through vents 90 and out the top of infuser 10 and still fall within the scope of the invention.

In the cooling configuration described above, shell 96 may also become heated during normal use as a result of the heated air being expelled through vents 90 in shell 96. An alternative embodiment of the invention may include a thermal barrier between shell 96 and heat exchanger 14 to prevent or reduce heat transfer back into the parts of infuser 10 that are intended to remain cold, such as heat exchanger 14. PTFE or silicone could be used as possible thermal barrier materials. There are also many different shapes and possible configurations for such a thermal barrier, such a flat and circular washer shape.

Thermoelectric cooling device 16, via its coupling to the overall cooling system (tubular column 40, heat exchanger 14, thermoelectric cooling device 16, heat sink 36, and cooling fan 38) controls the temperature of liquid 28 in fillable container 12 during infusion. For example, thermoelectric cooling device 16 can cool liquid 28 (meaning reduce or maintain its temperature) to approximately 26° F. during the infusion process. The cooling system is adjustable so that the liquid 28 can be maintained at different temperatures via thermoelectric cooling device 16. For example, thermoelectric cooling device 16 can be adjusted to keep liquid 28 at a temperature between 0° F. and 70° F., which is desirable because different liquids should be kept at different temperatures when being served. Thermoelectric cooling device 16 can also control the temperature of liquid 28 by making sure that it does not exceed a pre-set temperature level. Thus, if liquid 28 enters fillable container 12 at a temperature below this pre-set temperature level, it can be dispensed at a temperature lower than the pre-set temperature level, even if it is higher than the temperature it entered at.

A typical beer can be appropriately infused within approximately one minute after coming into contact with infusing material 24. Because fillable container 12 can contain approximately twelve ounces of liquid, fillable container 12 acts as a reservoir to infuse liquid 28 while some of liquid 28 is being delivered to the end user. The size (and geometrical cross section) of fillable container 12 can vary, holding more or less liquid depending on the needs of the operator, the aesthetics desired, and the type of liquid being infused, thereby potentially allowing for faster or more appropriate delivery of infused liquids. In the case of hard liquors, which are typically served in smaller quantities than beer (e.g., 1-3 ounces), it is desirable to having a smaller storage capacity so as not to needlessly fill fillable container 12 with liquid 28 that may not be used or become over infused after time. Thus, fillable container 12 could be designed to hold between one and three ounces when intended to infuse hard liquor. Alternatively, fillable container 12 could hold much larger quantities (e.g., 32-128 ounces) when designed to infuse liquids that are served in larger quantities (or expected to be served in rapid succession), such as for water, soft drinks, or beer.

Other liquids, such as wine, cider, hard liquor (e.g., distilled beverage, spirit, liquor, hard alcohol, etc.), soft drinks (e.g., cola, soda, pop, tonic, seltzer, and other types of carbonated beverages), iced tea, or water, could be used with infuser 10 to provide the end user with other types of infused and flavored beverages. As stated above, thermoelectric cooling device 16 can be adjusted for each type of liquid, thereby enhancing the end user's experience. For example, vodka could be infused at 0-40° F., beer at 25-35° F., soda at 35-45° F., white wines at 40-55° F., water at 50-60° F., and red wines at 50-70° F. Given the temperature tunability and range of a thermoelectric cooling device, these and other liquids could be infused at higher or lower temperatures than these ranges, as desired.

While the preferred embodiment utilizes thermoelectric cooling device 16 to control the temperature of liquid 28 during infusion (because of its ease of use, compactness, and convenience), other types of cooling devices could be used instead and fall within the scope of the invention. For example, a liquid coolant lines (e.g., cold water, antifreeze, or glycol) or gaseous coolant lines (e.g., carbon dioxide, non-halogenated hydrocarbons, and other refrigerants) passing through a conductive cap or block could be used in the cooling system. Alternatively, a solid coolant source, such as ice or dry ice, could be used, as well. In these alternative configurations, it may not be necessary to use a heat sink or heat-dissipating device.

Similarly, other heat-dissipating devices that will transfer the heat away from heat sink 36, such as the solid, liquid, and gaseous cooling mechanisms described above can replace cooling fan 38 and fall within the scope of the invention. A rapidly depressurized gas could also be used as a heat dissipating mechanism.

Figure 12:
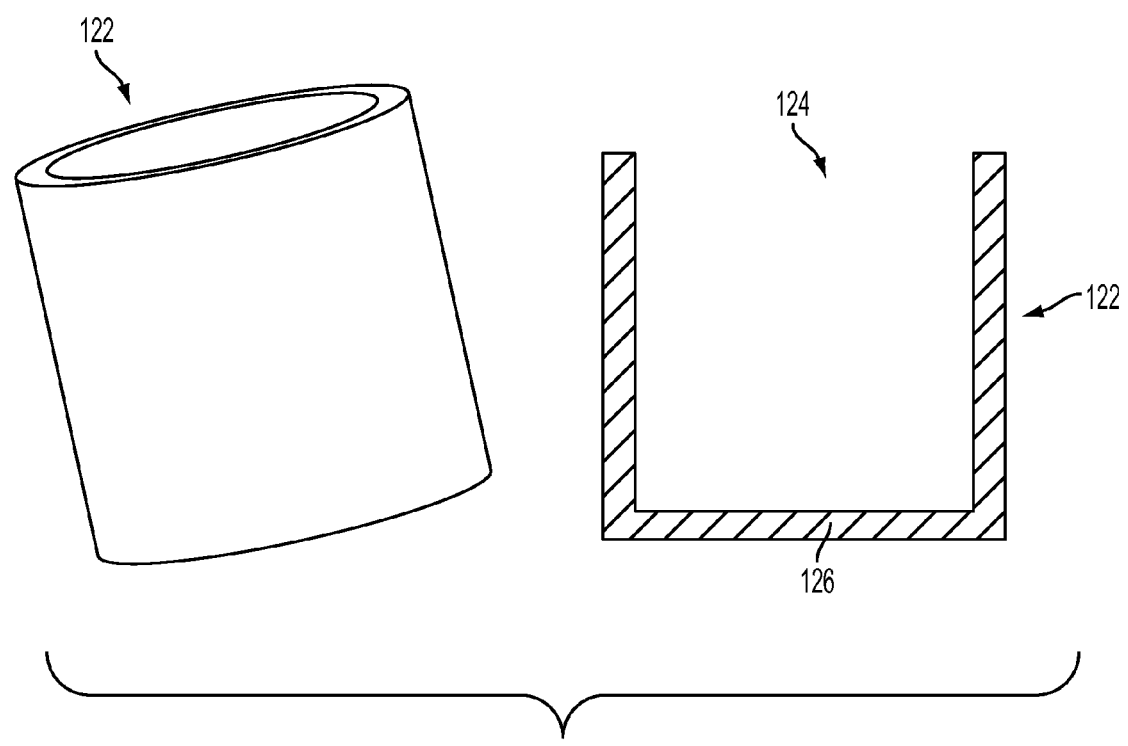
FIG. 12 is a side view of an open-ended cooling canister of an alternative embodiment.

In one particular alternative embodiment that does not require the use of electricity during the infusion process, thermoelectric cooling device 16, heat sink 36, and cooling fan 38 can be replaced by a passive cooling canister or chamber 122 that is in thermal contact with and resting above heat exchanger 14. In one embodiment (shown in FIG. 12), cooling canister 122 can be a 2.5" diameter by 3.5" high cylinder with an open end 124 and a closed end 126 that is made of either a thermally-conductive material, such as copper or stainless steel, or an insulating material, such as plastic or rubber. Other sizes, geometries, dimensions, and materials could be used and fall within the scope of the invention. Open-ended cooling canister 122 is filled with water and then placed in a freezer before use to create an ice-filled cooling canister. Once the water freezes, cooling canister 122 is placed in a receptacle in the top 18 of infuser 10 (to hold the cooling canister in place) with open end 124 (the ice end) directly in contact with heat exchanger 14 to control the temperature of liquid 28 during infusion. As cooling canister 122 warms from use or the passage of time, it can be replaced with another pre-chilled cooling canister. Water run-off from the ice melting in cooling canister 122 is channeled to a groove in the top of heat exchanger 14 and the receptacle so that it can drip down to a drip tray below infuser 10.

Figure 13:
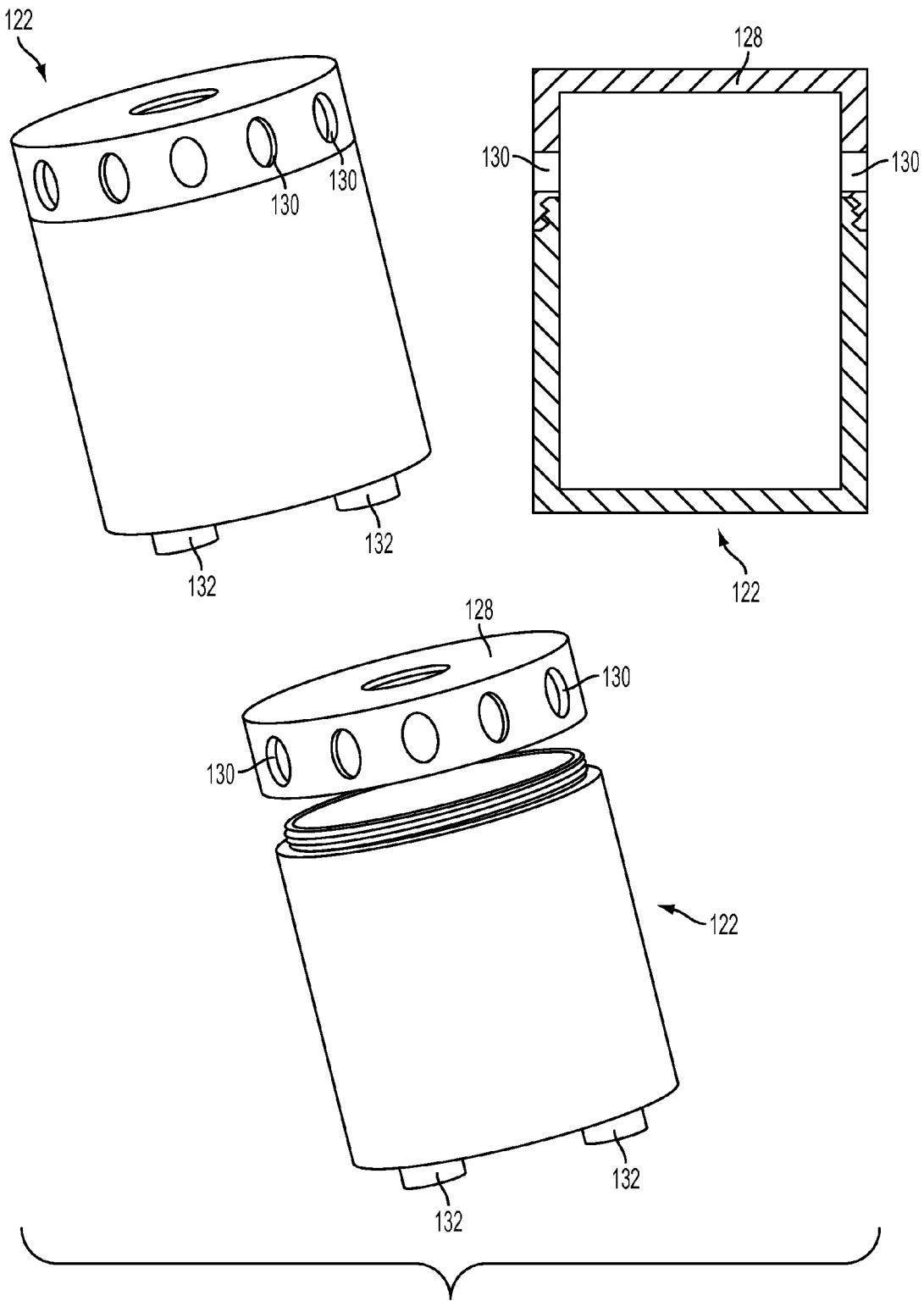
FIG. 13 is a side view of a closed, vented cooling canister of an alternative embodiment.

In other alternative embodiments, cooling canister 122 can be filled and sealed with a cooling medium (such as water, antifreeze, glycol, or an alcohol solution). Alternatively, as shown in FIG. 13), cooling canister 122 can have a removable top 128 (e.g. a threaded or liquid-tight lid or cap) such that the interior contents can be replaced or changed (which is useful when ice is used). In yet another alternative, cooling canister 122 can have venting holes 130 so that dry ice could be used as the cooling medium. In still another embodiment, an open-ended cooling canister 122 can be oriented such that the closed end 126 is directly in contact with heat exchanger 14.

In alternative embodiments, the cooling of liquid 28 via cooling canister 122 can be controlled by adjusting the thermal conductivity/pathway between cooling canister 122 and heat exchanger 14. If there a greater thermal pathway (such as by having a large surface contact area between cooling canister 122 and heat exchanger 14), cooling canister 122 will cool liquid 28 more quickly. A smaller thermal pathway (e.g., from a smaller surface contact area) will slow the cooling of liquid 28. The thermal pathway can be adjusted by placing thermally conductive spacers or "feet" 132 of different cross-sectional areas between cooling canister 122 and heat exchanger 14, as shown in FIG. 13. These spacers 132 can be permanently part of the bottom of cooling canister 122 or can be removable so as to allow the user to better control the cooling of liquid 28 or to use the same infuser with different liquids. Such control is helpful so as to avoid having cooling canister 122 freeze liquid 28 during infusion if extremely cold cooling media are used.

Figure 14:
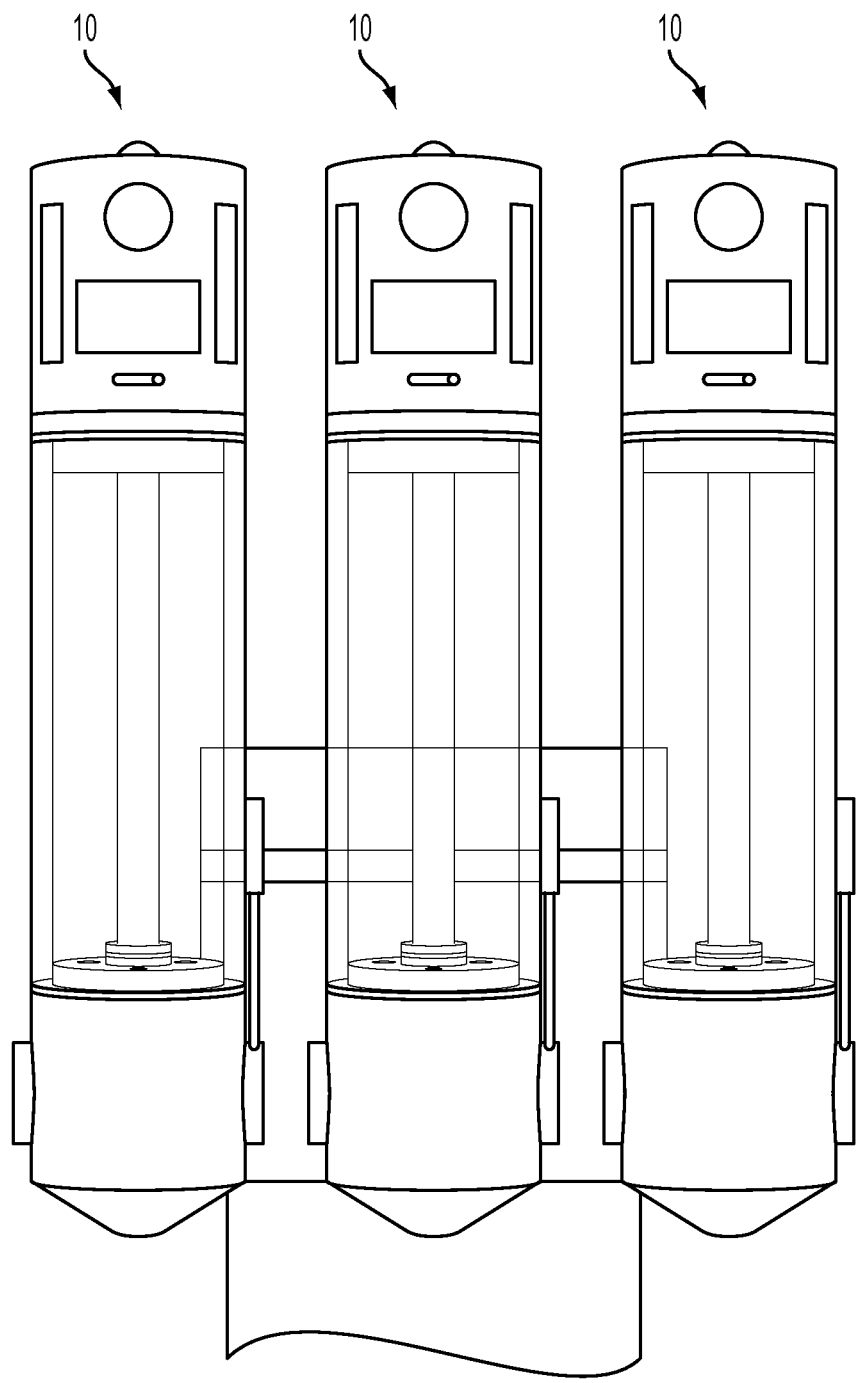
FIG. 14 is a front view of an alternative embodiment with multiple infusers.

Infuser 10 can be connected to an industry standard mount in a bar without having to re-engineer the tap station or bar via threaded end 32. This connectability makes installation of this embodiment convenient and inexpensive, thereby encouraging bars and other types of purveyors to install multiple infusers in their establishments. Alternatively, infuser 10 could be built into the bar or be a separate, stand-alone device, and not coupled to an industry standard mount, if desired. In another alternative, multiple infusers 10 could be coupled to the same source of liquid, thereby providing for different or multiple infusions of the same liquid, as shown in FIG. 14. To accomplish this, first inlets 30 of each infuser would be connected to the same source of liquid to transfer the liquid to the infusers and fillable containers for infusion.

In yet another embodiment, multiple infusers 10 could be connected together in series with the output of one feeding the input of another, such that liquid 28 is progressively infused with different (or successive) infusing materials 24 as liquid 28 passes from one infuser 10 to the next. Such a successive infusion could be done be connecting second outlet 44 of one infuser to first inlet 30 of another infuser via tubing or channeling (and repeating this as necessary to connect all of the infusers). The uninfused liquid would enter this system via first inlet 30 in the first infuser. The infused liquid would then be dispensed from second outlet 44 of the last infuser.

As discussed above, a variety of different types of infusing materials 24 can be placed in infuser 10 to create many different types of flavored beverages. An operator can remove top 18 and place infusing material 24 inside of fillable container 12. When top 18 is secured, the operator then allows liquid 28 to enter fillable container 12, thereby coming into direct contact with infusing material 24.

If the operator needs to clean infuser 10, the top 18 of infuser 10 can be removed to allow access to the interior 22 of fillable container 12. As shown in FIG. 1, gasket 82 is located between the top 18 of infuser 10 and the top of fillable container 12 in order to seal infuser 10 during operation, but allow this disassembly for filling and cleaning. In addition, fillable chamber 12 can be disconnected from infuser 10 and taken to an appropriate place for cleaning without having to disassemble the entire liquid delivery system. The device, in one embodiment, can also be cleaned in place like most other beer dispensing faucets, because it can be attached to an existing draft system faucet shank.

The invention also relates to a method or process of infusing a liquid, which can be done through one of the embodiments described above, among others. In order to infuse a liquid, a user places an infusing material inside a fillable container, which can hold both the infusing material and a liquid. Next, the user transfers liquid from a liquid source into the fillable container. After the liquid enters the fillable container, it comes into contact with the infusing material, and extracts some of the soluble properties from the infusing material, thereby infusing the liquid. In order to achieve a superior infusion, the temperature of the liquid is controlled during infusion, such that it is kept below a desired temperature or in a desired temperature range (such as by use of a thermoelectric cooling device or a passive cooling canister, among others). This temperature control can be particularly beneficial when infusing beer, for example. After being infused, the liquid is then dispensed into a desired container or receptacle. Optionally, the liquid can be filtered prior to being dispensed in order to remove any particulates or other matter that may have come free during the infusion process. With respect to an installation in a bar or restaurant, the user's or customer's experience of the process can be further enhanced if the fillable container has clear walls or sides that allow him or her to observe the infusion process as it is occurring and as his or her liquid is being dispensed.

The foregoing descriptions have been presented for purposes of illustration and description, and are not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A system for infusing liquids, comprising:
   a fillable container with an interior adapted to contain an infusing material and a liquid;
   a first inlet with an opening adapted to receive the liquid;
   a valve in fluid communication with the fillable container and the first inlet;
   a first outlet in fluid communication with the interior of the fillable container;
   a heat exchanger in thermal contact with the liquid in the fillable container; and
   a cooling device in thermal contact with the heat exchanger to control the temperature of the liquid as it is being infused, wherein the cooling device comprises a canister adapted to hold a cooling medium, wherein the canister has a removable top.

2. The system of claim 1, wherein the fillable container has sides that are vacuum jacketed.

3. The system of claim 1, wherein the fillable container is substantially cylindrical.

4. The system of claim 1, wherein the cooling device is comprised of a liquid coolant.

5. The system of claim 1, wherein the cooling device is comprised of a solid coolant.

6. The system of claim 1, wherein the cooling device is comprised of a gas coolant.

7. The system of claim 1, wherein the canister has an open end and a closed end.

8. The system of claim 1, wherein the canister has a vent.

9. The system of claim 1, wherein the cooling device is capable of cooling the liquid to between 40° F. and 70° F.

10. The system of claim 1, wherein the cooling device is capable of cooling the liquid to between 0° F. and 40° F.

11. The system of claim 1, wherein the heat exchanger is in thermal contact with the interior of the fillable container.

12. The system of claim 1, wherein the heat exchanger is in thermal contact with side walls of the fillable container.

13. The system of claim 1, wherein at least a portion of a side of the fillable container is transparent.

14. A system for infusing liquids, comprising: a fillable container with an interior adapted to contain an infusing material and a liquid; a first inlet adapted to receive the liquid; a valve in fluid communication with the fillable container and the first inlet; a first outlet in fluid communication with the fillable container; a heat exchanger in thermal contact with the liquid in the fillable container; and a cooling device in thermal contact with the heat exchanger to control the temperature of the liquid, wherein the cooling device comprises a thermoelectric cooling device.

15. The system of claim 14, further comprising:
   a heat sink in thermal contact with the thermoelectric cooling device; and
   a heat-dissipating device in thermal contact with the heat sink.

16. The system of claim 15, further comprising a temperature adjustment controller connected to the thermoelectric cooling device.

17. The system of claim 16, further comprising a temperature display connected to the thermoelectric cooling device.

18. The system of claim 15, wherein the heat-dissipating device is a cooling fan.

19. The system of claim 18, further comprising:
   a shell containing the cooling fan and the heat sink; and
   a vent in the shell.

20. The system of claim 19, further comprising a thermal barrier connected to the shell and the heat exchanger such that the thermal barrier is located between the shell and the heat exchanger.

21. The system of claim 15, wherein the heat-dissipating device is comprised of a liquid cooling line.

22. A system for infusing liquids, comprising:
   a fillable container with an interior adapted to contain an infusing material and a liquid;
   a first inlet with an opening adapted to receive the liquid;
   a valve in fluid communication with the fillable container and the first inlet;
   a first outlet in fluid communication with the interior of the fillable container;
   a heat exchanger in thermal contact with the liquid in the fillable container;
   a cooling device in thermal contact with the heat exchanger to control the temperature of the liquid as it is being infused, wherein the cooling device comprises a canister adapted to hold a cooling medium; and
   a thermally-conductive spacer between the canister and the heat exchanger.

23. The system of claim 22, wherein the cooling medium is permanently sealed inside the canister.

24. A system for infusing liquids, comprising: a fillable container with an interior adapted to contain an infusing material and a liquid; a first inlet adapted to receive the liquid; a valve in fluid communication with the fillable container and the first inlet; a first outlet in fluid communication with the fillable container; a heat exchanger in thermal contact with the liquid in the fillable container; and a cooling device in thermal contact with the heat exchanger to control the temperature of the liquid; a drain port located at the bottom of the fillable container and in fluid communication with the fillable container and wherein the valve is also in fluid communication with the drain port and wherein the valve has at least one or both of the following settings: a standby setting that does not allow the liquid to exit the system; a dispensing setting that allows the liquid to flow through and out of the system; and a drain setting that blocks the liquid from entering the fillable container but allows the liquid in the fillable container to leave the system through the drain port.

25. The system of claim 24, wherein the valve also has a bypass setting that allows the liquid to flow from the first inlet and out of the system without entering the fillable container.

26. The system of claim 24, further comprising:
    a second inlet with an opening in fluid communication with the valve and the interior of the fillable container, wherein the second inlet is located after the valve; and
    a second outlet in fluid communication with the first outlet, wherein the second outlet is located after the first outlet.

27. The system of claim 26, wherein the opening of the second inlet is larger than the opening of the first inlet.

28. The system of claim 24, further comprising a plurality of second inlets with openings in fluid communication with the valve and the interior of the fillable container, wherein the plurality of second inlets are located after the valve.

29. The system of claim 28, wherein at least one of the openings of the plurality of second inlets is larger than the opening of the first inlet.

30. The system of claim 26, wherein the first outlet is located above the bottom of the fillable container and the second outlet is located below the first outlet.

31. The system of claim 30, wherein the first outlet is located at the top of the fillable container.

32. The system of claim 30, further comprising a first filter located in the fillable container.

33. The system of claim 32, further comprising a second filter located in the fillable container.

34. The system of claim 32, further comprising a source of the liquid, wherein the source of the liquid is in fluid communication with the first inlet.

35. The system of claim 34, wherein the source of the liquid is a beer keg.

36. The system of claim 34, wherein the source of the liquid is a wine cask.

37. The system of claim 34, wherein the source of the liquid is a bright beer tank.

38. The system of claim 34, wherein the source of the liquid is a wooden aging barrel.

39. The system of claim 34, wherein the source of the liquid is a beer growler.

40. The system of claim 24, wherein the heat exchanger is in thermal contact with the interior of the fillable container.

41. The system of claim 24, wherein the heat exchanger is in thermal contact with side walls of the fillable container.

42. A system for infusing a liquid, comprising two infusing devices wherein each infusing device is comprised of:
    a fillable container with an interior adapted to contain an infusing material and a liquid;
    a first inlet adapted to receive the liquid;
    a valve in fluid communication with the fillable container and the first inlet;
    a first outlet in fluid communication with the interior of the fillable container;
    a heat exchanger in thermal contact with the liquid in the fillable container; and
    a cooling device in thermal contact with the heat exchanger to control the temperature of the liquid as it is being infused;
    wherein the first outlet of the first fillable container is in fluid communication with the first inlet of the second fillable container; or wherein the first inlet of each infusing device is connected to a single source of liquid; and
    wherein the cooling device of at least one or each infusing device comprises a canister adapted to hold a cooling medium, and wherein the canister has a removable top.

43. The system of claim 42, wherein the heat exchanger is in thermal contact with the interior of the fillable container.

44. The system of claim 42, wherein the heat exchanger is in thermal contact with side walls of the fillable container.

45. The system of claim 42, wherein the heat exchanger is in thermal contact with the interior of the fillable container.

46. A system for infusing liquids, comprising: a container configured and adapted to contain receive an infusing material and a liquid therein and for dispensing infused liquid; at least one valve in fluid communication with the container for receiving liquid or dispensing infused liquid; a heat exchanger in thermal contact with the liquid in the fillable container; and a cooling device in thermal contact with the heat exchanger to control the temperature of the liquid, wherein the cooling device comprises a liquid coolant; wherein the cooling device comprises a canister adapted to hold a cooling medium, and wherein a thermally-conductive spacer is present between the canister and the heat exchanger.

47. The system of claim 46, further comprising:
    a first inlet adapted to receive the liquid, wherein the valve is in fluid communication with the container and the first inlet;
    a plurality of second inlets with openings in fluid communication with the valve and the interior of the container, wherein the second inlets are located after the valve;
    a first outlet located at the top of the interior of the fillable container and in fluid communication with the interior of the container;
    a filter located in the container;
    a second outlet in fluid communication with the first outlet, wherein the second outlet is located below and after the first outlet;
    a heat exchanger in thermal contact with the liquid in the container;
    wherein the cooling device is a thermoelectric cooling device that is in thermal contact with the heat exchanger to control the temperature of the liquid as it is being infused;
    a temperature adjustment controller connected to the thermoelectric cooling device;
    a heat sink in thermal contact with the thermoelectric cooling device; and
    a cooling fan located proximate to the heat sink and positioned to remove heat from the heat sink.

48. The system of claim 47, further comprising:
    a handle connected to the valve;
    a temperature display connected to the thermoelectric cooling device; and
    a power switch coupled to the thermoelectric cooling device and the cooling fan;
    wherein the fillable container has clear sides and the heat exchanger is in thermal contact with the interior of the fillable container.

49. The system of claim 46, wherein the heat exchanger is in thermal contact with side walls of the fillable container.

* * * * *